US012393331B2

(12) United States Patent
Hu et al.

(10) Patent No.: US 12,393,331 B2
(45) Date of Patent: Aug. 19, 2025

(54) METHOD, DEVICE, AND PROGRAM PRODUCT FOR MANAGING STORAGE SYSTEM

(71) Applicant: EMC IP Holding Company LLC, Hopkinton, MA (US)

(72) Inventors: Jun Hu, Shanghai (CN); Jinqing Xu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 685 days.

(21) Appl. No.: 17/738,259

(22) Filed: May 6, 2022

(65) Prior Publication Data

US 2023/0004292 A1 Jan. 5, 2023

(30) Foreign Application Priority Data

Jul. 1, 2021 (CN) .......................... 202110745926.3

(51) Int. Cl.
*G06F 3/06* (2006.01)
*H04L 41/12* (2022.01)

(52) U.S. Cl.
CPC .......... *G06F 3/0604* (2013.01); *G06F 3/0655* (2013.01); *G06F 3/067* (2013.01); *H04L 41/12* (2013.01)

(58) Field of Classification Search
CPC .... G06F 3/0604; G06F 3/0605; G06F 3/0653; G06F 3/0655; G06F 3/067; H04L 41/12
See application file for complete search history.

(56) References Cited

U.S. PATENT DOCUMENTS

| | | | |
|---|---|---|---|
| 7,275,103 B1 | 9/2007 | Thrasher et al. | |
| 7,886,031 B1 | 2/2011 | Taylor et al. | |
| 9,300,536 B2 | 3/2016 | Agarwala et al. | |
| 10,992,533 B1 | 4/2021 | Vohra et al. | |
| 2014/0185429 A1* | 7/2014 | Takase | H04L 45/22 370/225 |
| 2016/0007102 A1* | 1/2016 | Raza | H04L 49/356 398/45 |
| 2016/0142291 A1* | 5/2016 | Polland | H04L 43/10 370/392 |
| 2017/0093713 A1* | 3/2017 | Garcia-Luna-Aceves | H04L 45/745 |
| 2019/0057056 A1* | 2/2019 | Chen | G06F 13/4022 |
| 2021/0096771 A1* | 4/2021 | Inoue | G06F 3/0689 |

* cited by examiner

*Primary Examiner* — Awet Haile
(74) *Attorney, Agent, or Firm* — BainwoodHuang

(57) ABSTRACT

A technique manages a storage system. In particular, multiple cable lists associated with multiple nodes included in the storage system are acquired, respectively, a cable list including an identifier of cable of at least one cable for connecting a node of the multiple nodes with a node other than the node. A distance between a first node in the multiple nodes and a second node in the multiple nodes is determined based on a comparison between a first cable list associated with the first node and a second cable list associated with the second node in the multiple cable lists. A network structure of the storage system is determined based on the distance between the first node and the second node. Accordingly, the distances between the nodes can be determined in a simple and effective manner, and thus the network structure of the storage system can be determined.

20 Claims, 7 Drawing Sheets

METHOD, DEVICE, AND PROGRAM PRODUCT FOR MANAGING STORAGE SYSTEM

CROSS-REFERENCE TO RELATED APPLICATION

This application claims priority to Chinese Patent Application No. CN202110745926.3, on file at the China National Intellectual Property Administration (CNIPA), having a filing date of Jul. 1, 2021, and having "METHOD, DEVICE, AND PROGRAM PRODUCT FOR MANAGING STORAGE SYSTEM" as a title, the contents and teachings of which are herein incorporated by reference in their entirety.

TECHNICAL FIELD

Implementations of the present disclosure relate to storage systems and, more specifically, to a method, a device, and a computer program product for managing the network structure of a storage system.

BACKGROUND

With the development of storage technologies and networking technologies, a current storage system can involve a large number of devices that can be connected via a network and distributed in one or more data centers. New storage devices can be added to the storage system during its operation, and failed storage devices can be removed from the storage system. In addition, the connection relationships between the devices may change. Therefore, for a large storage system including a large number of devices, how to manage the network structure of the storage system more effectively has become a hot topic of research.

SUMMARY OF THE INVENTION

Therefore, it is desired to develop and implement a technical solution for managing a storage system in a more effective manner. It is expected that this technical solution can be compatible with existing storage systems and can manage the network structure of a storage system in a more convenient and effective manner.

According to a first aspect of the present disclosure, a method for managing a storage system is provided. In this method, multiple cable lists associated with multiple nodes included in the storage system are acquired, respectively, a cable list including an identifier of cable of at least one cable for connecting a node of the multiple nodes with a node other than the node. A distance between a first node in the multiple nodes and a second node in the multiple nodes is determined based on a comparison between a first cable list associated with the first node and a second cable list associated with the second node in the multiple cable lists. A network structure of the storage system is determined based on the distance between the first node and the second node.

According to a second aspect of the present disclosure, an electronic device is provided, including: at least one processor; a volatile memory; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and includes machine-executable instructions used for performing the method according to the first aspect of the present disclosure.

BRIEF DESCRIPTION OF THE DRAWINGS

In combination with the accompanying drawings and with reference to the following detailed description, the features, advantages, and other aspects of implementations of the present disclosure will become more apparent, and several implementations of the present disclosure are illustrated here by way of examples rather than limitation. In the accompanying drawings, FIG. 1 schematically illustrates a block diagram of an application environment in which example implementations of the present disclosure may be implemented.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more detail below with reference to the accompanying drawings. Although preferred implementations of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," and the like may refer to different or identical objects. Other explicit and implicit definitions may also be included below.

Figure 1:
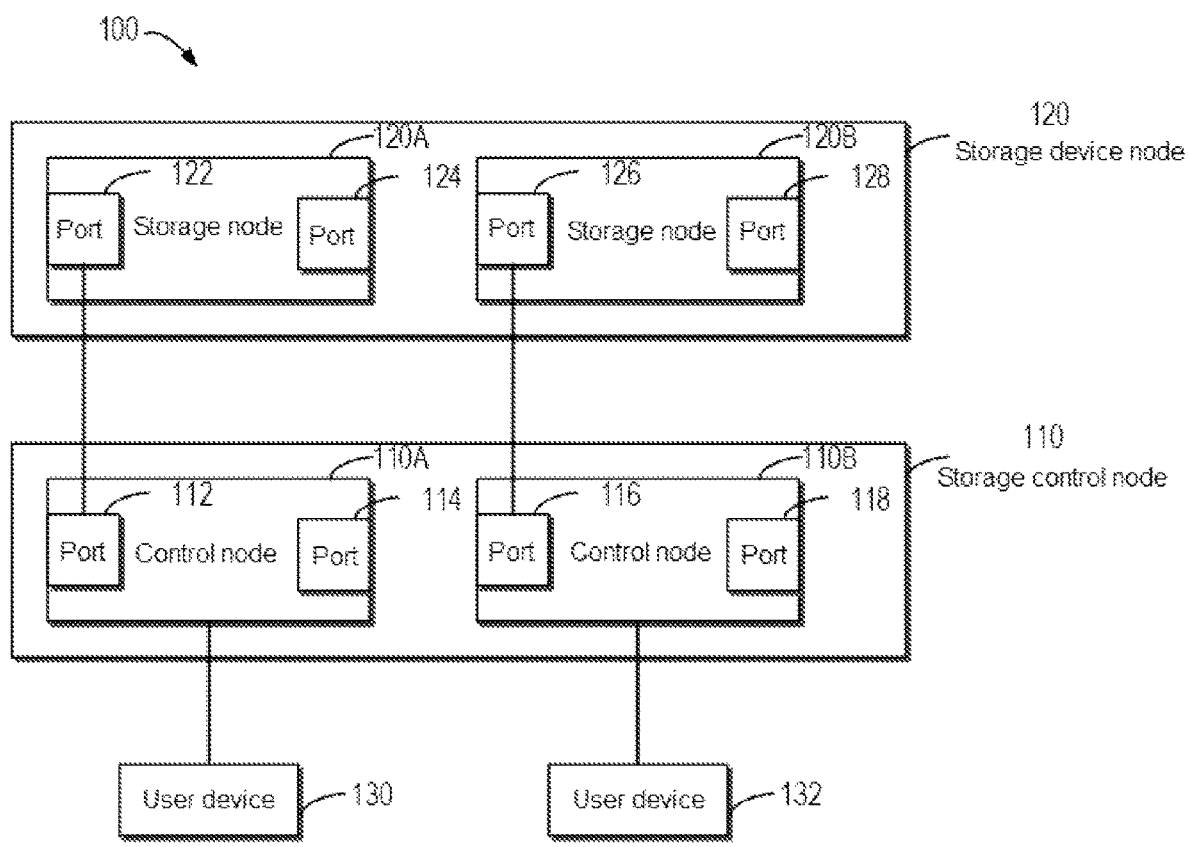

For ease of description, an application environment according to an example implementation of the present disclosure is first described with reference to FIG. 1. FIG. 1 schematically illustrates a block diagram of application environment 100 in which example implementations of the present disclosure may be implemented. As shown in FIG. 1, application environment 100 may include multiple types of nodes, such as storage control node 110 and storage device node 120. Each node may include one or more portions. For example, storage control node 110 may include control node 110A and control node 110B, and two control nodes 110A and 110B can serve data access requests from user devices external to the storage system in parallel. For example, control node 110A can serve user device 130, and control node 110B can serve user device 132. Although FIG. 1 illustrates only user devices 130 and 132, more user devices can be connected to control nodes 110A and 110B, respectively.

As shown in FIG. 1, control node 110A may include ports 112 and 114, and control node 110B may include ports 116 and 118. Similarly, storage device node 120 may include storage node 120A (including ports 122 and 124) and storage node 120B (including ports 126 and 128). Storage control node 110 and storage device node 120 can be connected to each other via these ports. For example, port 122 can be connected to port 112, and port 126 can be connected to port 116.

It will be understood that since storage control node 110 is limited in respect of the number of ports and can only be connected to a limited number of storage device nodes, multiple storage device nodes can be connected in a serial manner such that storage control node 110 can access more storage space. At this point, a complex network structure can exist among multiple nodes (e.g., including one storage control node and multiple storage device nodes) in the storage system.

At present, a technical solution for determining the network structure of various nodes based on the media access control (MAC) address of each port has been proposed. Specifically, at the initial stage of startup of a storage system, the MAC address of each port can be acquired, and probe messages can be sent between the nodes to determine the network structure. However, this technical solution is tightly coupled with port addresses of physical devices of the nodes, and the probe messages will result in additional network loads. Thus, it is expected to provide a technical solution to determine the network structure of a storage system in a more effective manner. Further, it is expected that this technical solution can be compatible with existing storage systems and thus improve the performance of the storage systems.

Figure 2:
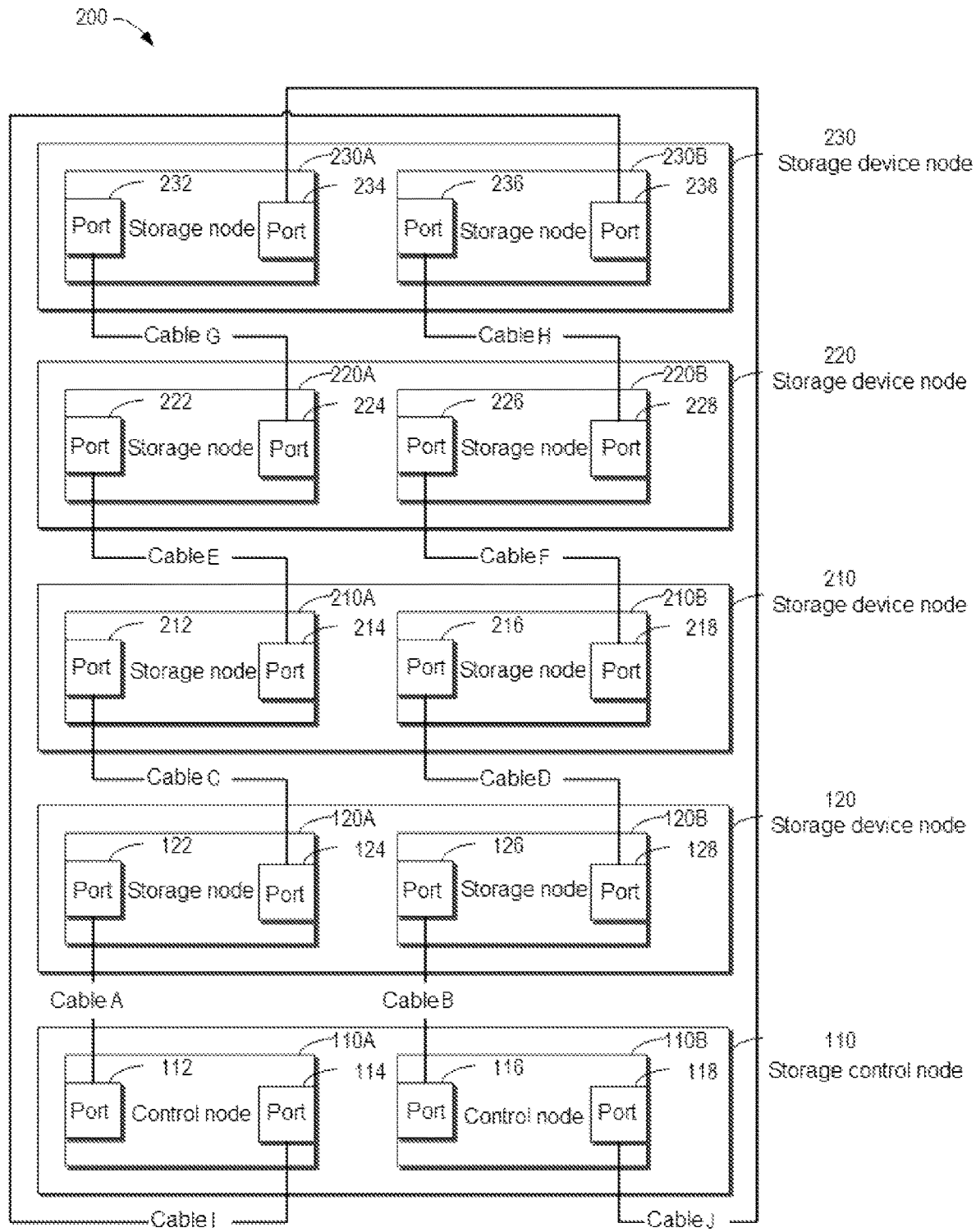
FIG. 2 schematically illustrates a block diagram of a storage system according to an example implementation of the present disclosure.

In order to at least partially eliminate the shortcomings in the technical solution described above, a method for managing a storage system is provided according to an example implementation of the present disclosure. An overview of an example implementation according to the present disclosure is first described with reference to FIG. 2. FIG. 2 schematically illustrates a block diagram of storage system 200 according to an example implementation of the present disclosure. As shown in FIG. 2, multiple storage device nodes 120, 210, 220, 230 are connected in series with each other and connected to storage control node 110. Specifically, storage device node 210 may include storage node 210A (including ports 212 and 214) and storage node 210B (including ports 216 and 218), storage device node 220 may include storage node 220A (including ports 222 and 224) and storage node 220B (including ports 226 and 228), and storage device node 230 may include storage node 230A (including ports 232 and 234) and storage node 230B (including ports 236 and 238).

As shown in FIG. 2, the nodes are connected via cables. Ports 122 and 112 are connected via cable A, ports 126 and 116 are connected via cable B, ports 212 and 124 are connected via cable C, ports 216 and 128 are connected via cable D, ports 222 and 214 are connected via cable E, ports 226 and 218 are connected via cable F, ports 232 and 224 are connected via cable G, ports 236 and 228 are connected via cable H, ports 238 and 114 are connected via cable I, and ports 234 and 118 are connected via cable J. It will be understood that although FIG. 2 illustrates only 4 storage device nodes, according to an example implementation of the present disclosure, storage system 200 may include more or fewer storage device nodes.

According to an example implementation of the present disclosure, multiple ports of each node can be connected respectively to multiple ports of other nodes. A cable list can be determined for each node, and here, a cable list associated with one node may include an identifier of cable connected to each of the multiple ports of that node. Multiple cable lists associated with the multiple nodes included in the storage system can be acquired respectively. As shown in FIG. 2, the cable list for each node may include 4 cables. For example, the cable list for storage control node 110 may include cables A, B, I, and J, and the cable list for storage device node 120 may include cables A, B, C, and D.

The above two cable lists can be compared to determine a distance between the two nodes. For example, both of the above cable lists include cables A and B, and thus it can be determined that storage control node 110 and storage device node 120 are directly connected (the distance being 1). Further, each pair of cable lists can be processed in order to determine distances between other nodes. Following this, the network structure of the storage system can be determined based on the determined distances.

With the example implementation of the present disclosure, the network structure among the nodes in the storage system can be determined directly based on the identifiers of the cables connected to the storage system without acquiring the MAC address of each port and without sending additional messages. In this way, the network structure of the storage system can be determined in a simpler manner independent of the ports of the physical nodes.

Figure 3:
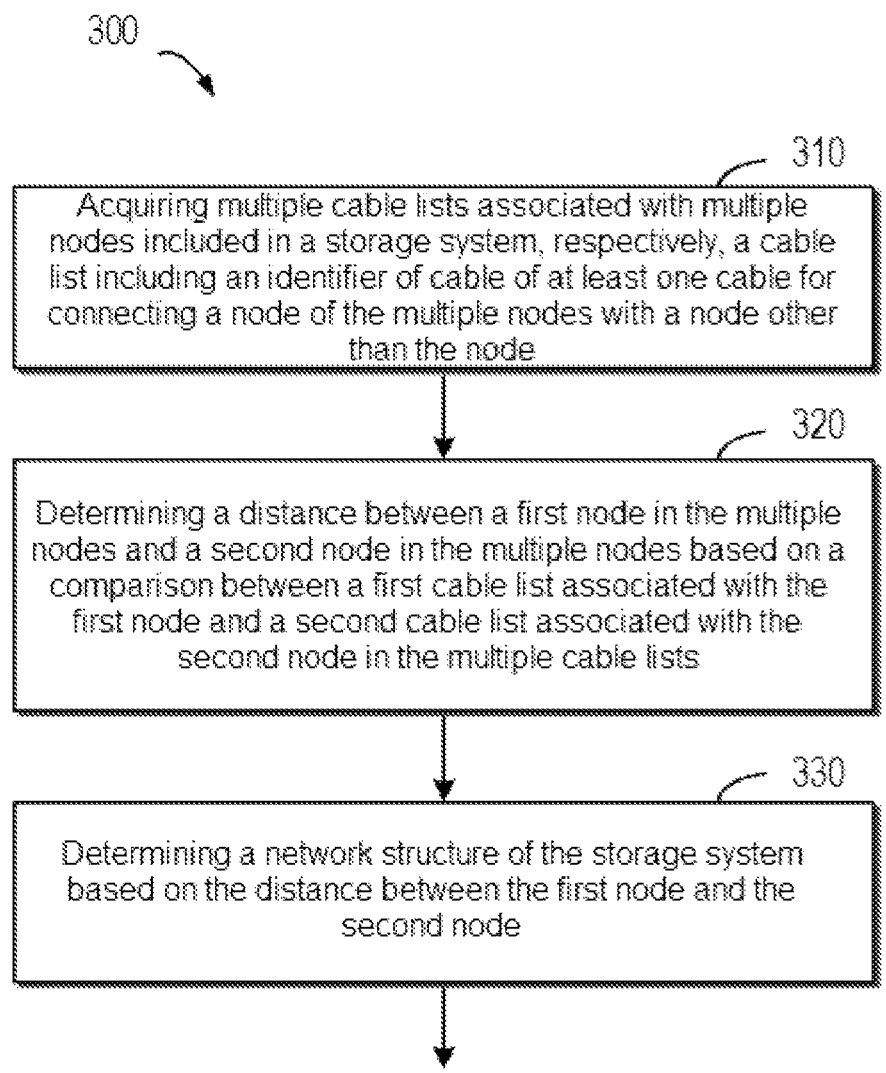
FIG. 3 schematically illustrates a flow chart of a method for managing a storage system according to an example implementation of the present disclosure.

Hereinafter, more details of an example implementation according to the present disclosure are described with reference to FIG. 3. FIG. 3 schematically illustrates a flow chart of method 300 for managing a storage system according to an example implementation of the present disclosure. At block 310 in FIG. 3, multiple cable lists associated with multiple nodes included in the storage system are acquired, respectively, a cable list including an identifier of cable of at least one cable for connecting a node of the multiple nodes with a node other than the node. According to an example implementation of the present disclosure, the nodes can be processed one by one to determine the cable list associated with each node. Specifically, the cable list can be determined based on the manner as shown in FIG. 4.

Figure 4:
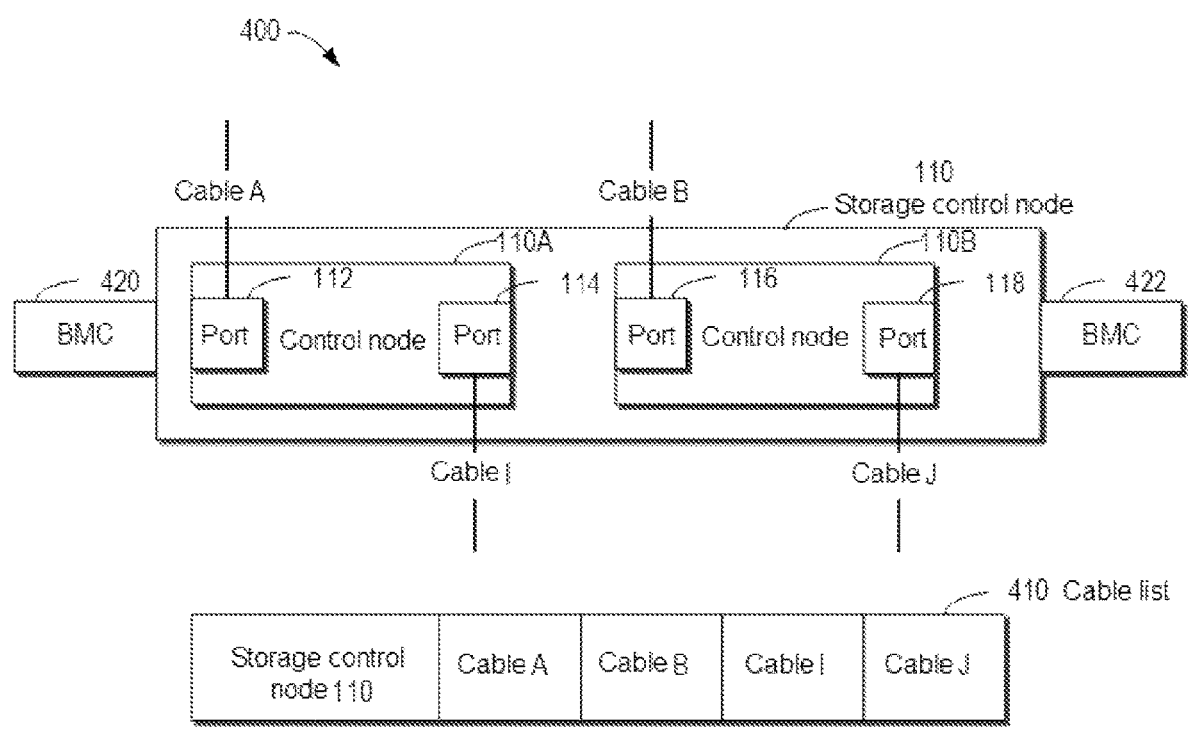
FIG. 4 schematically illustrates a block diagram for acquiring a cable list according to an example implementation of the present disclosure.

FIG. 4 schematically illustrates block diagram 400 for acquiring a cable list according to an example implementation of the present disclosure. As shown in FIG. 4, storage control node 110 includes 4 ports 112, 116, 114, and 118, and 4 cables A, B, I, and J are connected to the above ports, respectively. At this point, cable list 410 of storage node 110 can be determined. This cable list may include multiple fields. In a left-to-right order, the first field can represent the identifier of the node (e.g., storage control node 110), and the subsequent 4 fields can each represent the identifier of a cable connected to each port of that node.

It will be understood that cable list 410 is merely illustrative and that according to an example implementation of the present disclosure, the cable list can be stored in other data structures. For example, the cables in the cable list can be stored in a different order. It will be understood that, for storage control node 110, the cables in the cable list can be arranged in other orders: cables A, I, B, J, or cables A, B, J, I, and so on. For another example, relevant cable lists for all of the nodes in storage system 200 can be stored in the manner of Table 1 below.

TABLE 1

Cable list

| Serial number | Node ID | Cable list | | | |
|---|---|---|---|---|---|
| 1 | Storage control node 110 | Cable A | Cable B | Cable I | Cable J |
| 2 | Storage device node 120 | Cable A | Cable B | Cable C | Cable D |
| 3 | Storage device node 210 | Cable E | Cable F | Cable C | Cable D |
| 4 | Storage device node 220 | Cable E | Cable F | Cable G | Cable H |
| 5 | Storage device node 230 | Cable I | Cable J | Cable G | Cable H |

In Table 1, the first column shows serial numbers, the second column shows identifiers of the nodes, and the subsequent columns show lists of cables connected to the ports of the nodes. Specifically, as shown in the second row of Table 1, storage device node 120 is connected to other nodes in storage system 200 via cables A, B, C, and D, respectively.

According to an example implementation of the present disclosure, the cable list can be read from a Baseboard Management Controller (BMC) associated with one node. As shown in FIG. 4, each control node may have an associated baseboard management controller (BMC 420 for control node 110A and BMC 422 for control node 110B). Identifiers of cables connected to the relevant control nodes can be read respectively from the above BMCs. For example, cable A and cable I can be read from BMC 420, and cable B and cable J can be read from BMC 422.

With the example implementation of the present disclosure, it is not necessary to know the MAC address of each port, but rather the identifier of each cable can be read directly from the BMC. In this way, once the end of a certain cable is inserted into port 112, BMC 420 can read the identifier of the cable from that end. Similarly, if the other end of the cable is inserted into another port in another node, the BMC used to control that another port can read the identifier of the cable from the other end. In this way, it is not necessary to know the MAC addresses of the ports, and thus relevant cable lists can be determined in a way that is independent of hardware ports of storage control node 110.

Return to FIG. 3 to describe further processing for the cable list. At block 320 in FIG. 3, a distance between a first node in the multiple nodes and a second node in the multiple nodes is determined based on a comparison between a first cable list associated with the first node and a second cable list associated with the second node in the multiple cable lists. In this step, each pair of cable lists in the multiple cable lists can be compared respectively. Specifically, the cable list in row 1 of Table 1 above can be compared with the cable lists in rows 2, 3, 4, and 5, respectively. For another example, the cable list in row 2 in Table 1 above can be compared with the cable lists in rows 3, 4, 5, respectively, and so on.

Figure 5:
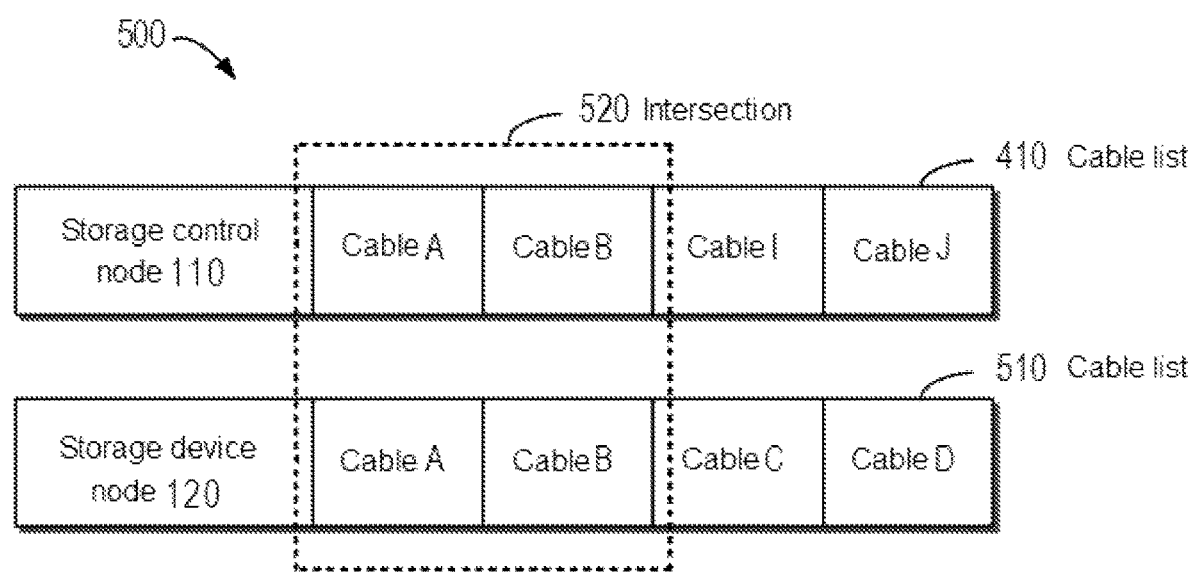
FIG. 5 schematically illustrates a block diagram for determining a distance between nodes based on a comparison between cable lists according to an example implementation of the present disclosure.

According to an example implementation of the present disclosure, the distance between two nodes can be determined based on whether there is an intersection between the two cable lists. Specifically, if it is determined that there is an intersection between the first cable list and the second cable list, the distance between the first node and the second node is determined to be 1. Hereinafter, using storage control node 110 and storage device node 120 as examples of nodes, a description of how to determine the distance between the two will be provided. FIG. 5 schematically illustrates block diagram 500 for determining a distance between nodes based on a comparison between cable lists according to an example implementation of the present disclosure. As shown in FIG. 5, cable list 410 of storage control node 110 includes cables A, B, I, and J, and cable list 510 of storage device node 120 includes cables A, B, C, and D. At this point, there is intersection 520 between the two lists, and thus the distance between storage control node 110 and storage device node 120 can be set to 1. For example, the distance between storage control node 110 and each of the other nodes can be recorded in the table shown in Table 2 below.

TABLE 2

Distance List

| Serial number | Node ID | Cable list | | | | Distance |
|---|---|---|---|---|---|---|
| 1 | Storage control node 110 | Cable A | Cable B | Cable I | Cable J | 0 |
| 2 | Storage device node 120 | Cable A | Cable B | Cable C | Cable D | 1 |
| 3 | Storage device node 210 | Cable E | Cable F | Cable C | Cable D | |
| 4 | Storage device node 220 | Cable E | Cable F | Cable G | Cable H | |
| 5 | Storage device node 230 | Cable I | Cable J | Cable G | Cable H | |

The difference between Table 2 and Table 1 is that the last column of Table 2 shows distances. The distances between storage control node 110 and other nodes can be determined by using storage control node 110 as the "origin." In this case, the distance between storage control node 110 and itself can be set to 0. By referring to FIG. 5, it can be seen that the distance between storage control node 110 and storage device node 120 is 1, so the distance can be set to 1 at the second row in Table 1. Further, other cable lists can be processed in a similar manner. For example, the intersection of the node lists of storage device nodes 120 and 210 is cables C and D, and thus the distance between the two is 1.

According to an example implementation of the present disclosure, the distance list can be set for other nodes in a similar manner.

It will be understood that Table 2 above is merely schematic, and according to an example implementation of the present disclosure, the distances between the nodes can be recorded in other ways. For example, the distances described above can be represented by an N*N (N being the number of nodes in storage system 200) dimensional matrix, where the element at position (i, j) in the matrix represents the distance between the i th node and the j th node.

According to an example implementation of the present disclosure, if there is no direct connection between two nodes (i.e., there is no intersection between two cable lists), whether there is an indirect connection between the two nodes can then be determined, i.e., whether there is a path that includes multiple connections is determined. Specifically, a third node can be selected from the multiple nodes (the distance from this third node to the first node is known). Following that, the distance between the first node and the second node is determined based on a comparison between the first cable list and a third cable list associated with the third node in the multiple cable lists.

Referring to Table 2, assuming that it is desired to determine the distance between storage control node 110 and storage device node 210, and in this case, the cable list of storage control node 110 includes cables A, B, I, and J, the cable list of storage device node 210 includes cables E, F, C, and D, and there is no intersection between the two cable lists. At this point, storage device node 120 can be selected, the distance from this node to storage control node 110 is known to be 1, and its cable list includes cables A, B, C, and D. Following this, the cable list "cables E, F, C, and D" of storage device node 210 can be compared with the cable list "A, B, C, and D" of storage device node 120.

Further, the distance between storage device node 210 and storage device node 120 can be determined based on whether there is an intersection between the two cable lists. In this case, there is an intersection of "cables C and D" between the two cable lists, and then the distance between storage device node 210 and storage device node 120 can be determined to be 1. Further, based on the distance of 1 between storage control node 110 and storage device node 120 and the distance of 1 between storage device node 210 and storage device node 120, it can be determined that there is an indirect connection between storage control node 110 and storage device node 210, and the distance between the two is 1+1=2. At this point, the distances shown in Table 2 can be updated. Specifically, the distance of "2" can be added to the third row in Table 2. Updated Table 2 is shown in Table 3 below.

TABLE 3

Distance List

| Serial number | Node ID | Cable list | | | | Distance |
|---|---|---|---|---|---|---|
| 1 | Storage control node 110 | Cable A | Cable B | Cable I | Cable J | 0 |
| 2 | Storage device node 120 | Cable A | Cable B | Cable C | Cable D | 1 |
| 3 | Storage device node 210 | Cable E | Cable F | Cable C | Cable D | 2 |
| 4 | Storage device node 220 | Cable E | Cable F | Cable G | Cable H | |

TABLE 3-continued

Distance List

| Serial number | Node ID | Cable list | | | | Distance |
|---|---|---|---|---|---|---|
| 5 | Storage device node 230 | Cable I | Cable J | Cable G | Cable H | |

According to an example implementation of the present disclosure, processing can be iteratively performed continuously based on the method described above, and the distance between two nodes with an unknown distance can be determined based on the distances between an intermediate node and the two nodes with an unknown distance. For example, assuming that it is desired to determine the distance between storage control node 110 and storage device node 220, at this point, storage device node 210 with a known distance to both storage control node 110 and storage device node 220 can be selected. Further, the distance between storage control node 110 and storage device node 220 is determined based on the distance of 2 between storage control node 110 and storage control node 110 and the distance of 1 between storage control node 210 and storage control node 220: 2+1=3.

According to an example implementation of the present disclosure, the cable list associated with each node can be compared with the other cable lists one by one in order to determine all the distances in the network structure. After all the comparison processes have been completed, it can be confirmed that the network structure includes all the connection relationships between the multiple nodes. Specifically, the distance between storage control node 110 and each storage device node can be determined in a similar manner in order to obtain a distance list as shown in Table 4 below.

TABLE 4

Distance List

| Serial number | Node ID | Cable list | | | | Distance |
|---|---|---|---|---|---|---|
| 1 | Storage control node 110 | Cable A | Cable B | Cable I | Cable J | 0 |
| 2 | Storage device node 120 | Cable A | Cable B | Cable C | Cable D | 1 |
| 3 | Storage device node 210 | Cable E | Cable F | Cable C | Cable D | 2 |
| 4 | Storage device node 220 | Cable E | Cable F | Cable G | Cable H | 3 |
| 5 | Storage device node 230 | Cable I | Cable J | Cable G | Cable H | 4 |

It will be understood that only storage system 200 as shown in FIG. 2 is taken as an example above to describe an implementation for determining the distances between nodes. According to an example implementation of the present disclosure, storage system 200 may include a greater or smaller number of nodes, and in this case, processing can be performed iteratively based on the number of nodes in order to obtain the distances between the nodes. According to an example implementation of the present disclosure, distances between nodes can be determined based on the algorithm as shown in Table 5 below.

TABLE 5

Algorithm for determining distances between nodes

Id=1
Next_Cables_to_check = [Cable-A, Cable-B] # Nodes first Ports
Last_Cables_to_check = [Cable-I Cable-J] # Nodes last Ports
while Last_Cables_to_check != Next_Cables_to_check :
   Iterate_Cables_lists: # all cable metrics. iterator each object.
     if Next_Cables_to_check in current_ Cable_list.
current object cable list
     current_Id = Id++
     Next_Cables_to_check = current_ Cable_list - Next_Cable_to-
_check
     Continue In the algorithm shown in Table 5, the index (ID) of the current node can be set to 1, the next group of cables to be checked (Next_Cables_to_check) can be set to [Cable-A, Cable-B], and the last group of cables to be checked (Last_Cables_to_check) can be set to [Cable-I, Cable-J]. Afterwards, it can be compared to determine whether Next_Cables_to_check is included in the cable list of the current node (current_Cable_list) in the loop operation. If the determination result is "Yes," the index of the current node is added by 1, and the next group of cables to be checked in the next round is set to the difference between the cable list of the current node and the next group of cables to be checked (Next_Cables_to_check=current_Cable_list−Next_Cables_to_check). The above process can be iteratively performed continuously until the next group of cables to be checked is equal to the last group of cables to be checked. At this point, all the nodes in the storage system have been processed and the distances between the cables can be determined. At this point, each storage node is given an index, and the value of the index indicates the distance between that storage node and the storage control node.

Figure 6:
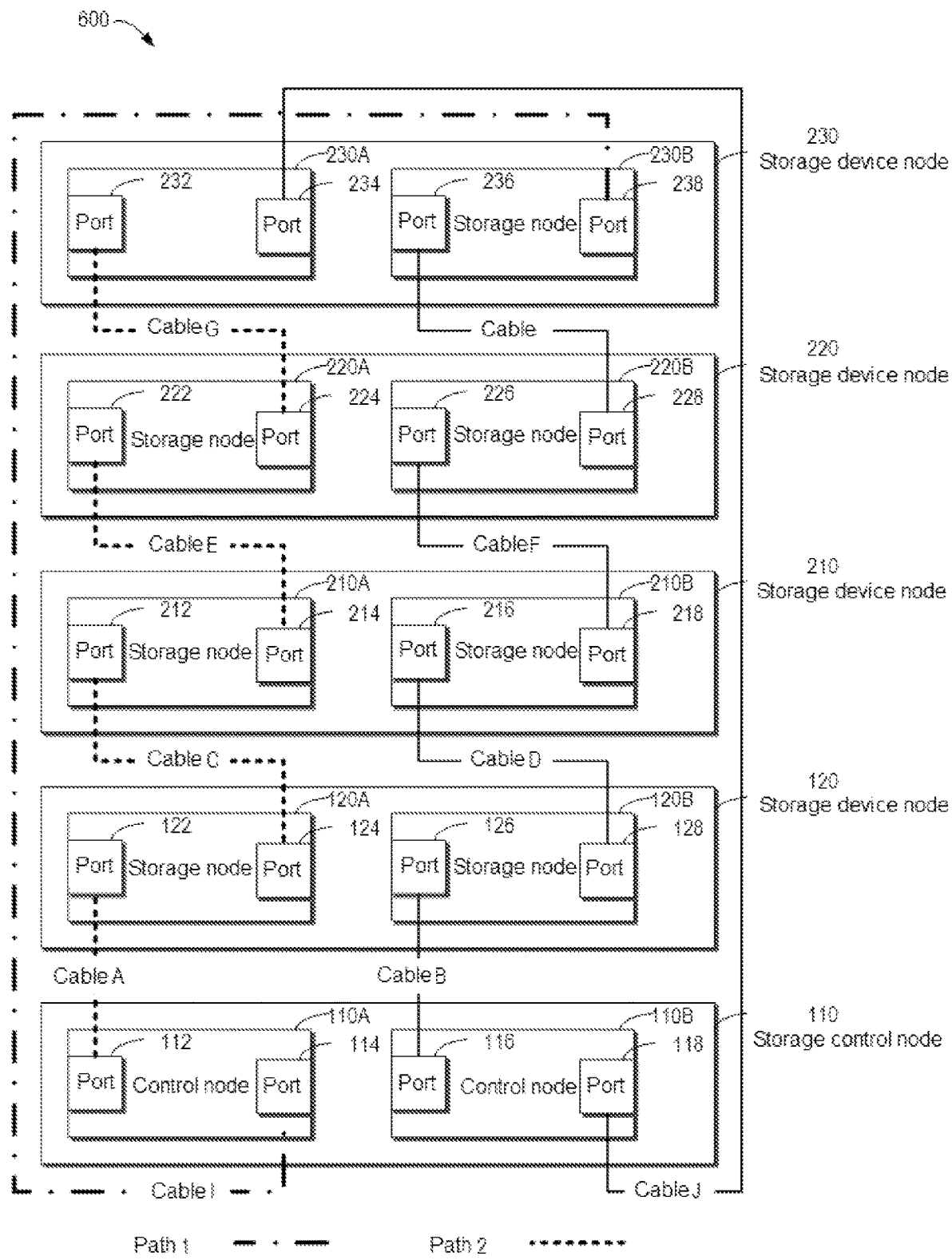
FIG. 6 schematically illustrates a block diagram of paths in a storage system according to an example implementation of the present disclosure.

According to an example implementation of the present disclosure, the multiple nodes can be connected in a loop, and at this point, there can be multiple paths between two nodes, and thus there can be multiple distances between the two nodes. In this case, the distances can be updated based on the number of the multiple nodes. FIG. 6 schematically illustrates block diagram 600 of paths in a storage system according to an example implementation of the present disclosure. As shown in FIG. 6, taking only control node 110A in storage control node 110 as an example, there are 2 paths between control node 110A and storage node 230A: path 1 (including cable I) as shown by the dotted line, and path 2 (including cables A, C, E, and G) as shown by the dashed line. In this case, the distance between the two nodes can be updated based on the algorithm shown in Table 6 below.

TABLE 6

Algorithm for updating distances between nodes if index > [(maxindex + 1)/2]:
     distance = maxIndex+1 − index
   else:
     distance = index In the above algorithm, if the index of a certain storage device node is greater than [(maxIndex+1)/2] (maxIndex refers to the maximum index, maxIndex=maximum number of nodes−1), this index can be updated based on maxIndex+1−index. For the example shown in FIG. 6, the distance between storage control node 110 and storage device node 230 determined based on path 2 is 4. At this point, the above distance can be updated to 4+1−4=1 based on the algorithm shown in Table 6, i.e., the distance determined via path 1. With the example implementation of the present disclosure, the shortest distance between two nodes can be found from a storage system that includes a loop. In this way, it is easy for the storage control node to access each storage device node via the shortest distance, thereby increasing the access speed and reducing the access latency.

Returning to FIG. 3, at block 330 of FIG. 3, the network structure of the storage system is determined based on the distance between the first node and the second node. In the case where the distances between the nodes have been determined based on the process described above, the network structure of storage system 200 can be represented based on the determined distances. According to an example implementation of the present disclosure, the network structure can be represented based on a graph. In this case, the nodes in the graph can represent storage control nodes/storage device nodes in the storage system, the edges in the graph can represent connections between the storage control nodes/storage device nodes, and the weights of the edges can represent distances. According to an example implementation of the present disclosure, the network structure can be represented based on a matrix manner. In this case, the element at position (i, j) in the matrix represents the distance between the i th node and the j th node.

According to an example implementation of the present disclosure, storage system 200 can be controlled based on the determined network structure. For example, if an access to a certain storage device node in the multiple storage device nodes is received at storage control node 110, a path for accessing the storage device node is determined based on the network structure, and then the storage control node is notified to access the storage device node based on the path. For example, assuming that an access to storage device node 230 is received at storage control node 110, based on the network structure determined above, path 1 as shown in FIG. 6 can be found to be the shortest path to access storage device node 230. Thus, storage control node 110 can be notified to access storage device node 230 via path 1.

With the example implementation of the present disclosure, the distances between the nodes can be determined directly based on the cables connecting the nodes in the storage system, and thus the network structure of the storage system can be determined. In this way, the network structure of the storage system can be determined in a simpler and more effective manner without the need to know the physical port addresses of the nodes.

Examples of the method according to the present disclosure have been described in detail above with reference to FIGS. 2 to 6, and implementations of a corresponding apparatus will be described below. According to an example implementation of the present disclosure, an apparatus for managing a storage system is provided. This apparatus includes: an acquiring module configured to acquire multiple cable lists associated with multiple nodes included in the storage system, respectively, a cable list including an identifier of cable of at least one cable for connecting a node of the multiple nodes with a node other than the node; a comparison module configured to determine a distance between a first node in the multiple nodes and a second node in the multiple nodes based on a comparison between a first cable list associated with the first node and a second cable list associated with the second node in the multiple cable lists; and a determination module configured to determine a network structure of the storage system based on the distance between the first node and the second node. According to an example implementation of the present disclosure, this apparatus further includes modules for performing other steps in method 300 described above.

Figure 7:
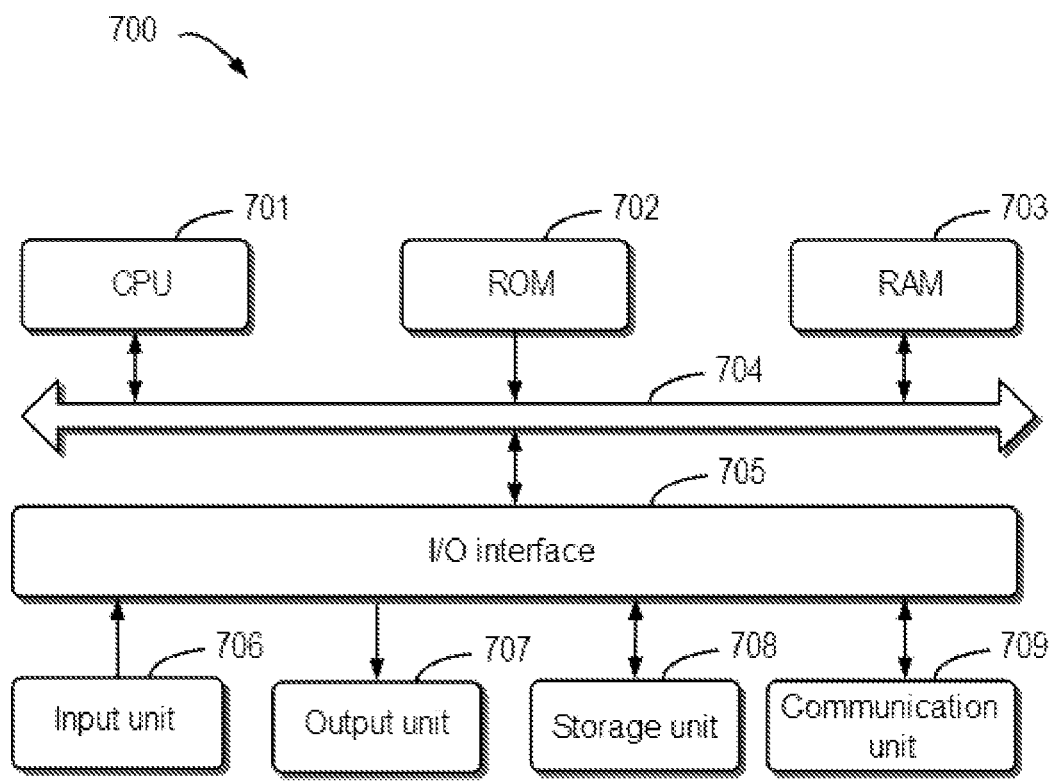
FIG. 7 schematically illustrates a block diagram of a device for managing a storage system according to an example implementation of the present disclosure.

FIG. 7 schematically illustrates a block diagram of device 700 for managing a storage system according to an example implementation of the present disclosure. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. In RAM 703, various programs and data required for the operation of device 700 may also be stored. CPU 701, ROM 702, and RAM 703 are connected to one another through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as method 300, may be performed by processing unit 701. For example, in some implementations, method 300 may be implemented as a computer software program that is tangibly included in a machine-readable medium, such as storage unit 708. In some implementations, part or all of the computer program may be loaded and/or installed onto device 700 via ROM 702 and/or communication unit 709. One or more steps of method 300 described above may be performed when the computer program is loaded into RAM 703 and executed by CPU 701. Alternatively, in other implementations, CPU 701 may also be configured in any other suitable manner to implement the above processes/methods.

According to an example implementation of the present disclosure, an electronic device is provided, including: at least one processor; a volatile memory; and a memory coupled to the at least one processor, wherein the memory has instructions stored therein which, when executed by the at least one processor, cause the device to perform a method for managing a storage system. This method includes: acquiring multiple cable lists associated with multiple nodes included in the storage system, respectively, a cable list including an identifier of cable of at least one cable for connecting a node of the multiple nodes with a node other than the node; determining a distance between a first node in the multiple nodes and a second node in the multiple nodes based on a comparison between a first cable list associated with the first node and a second cable list associated with the second node in the multiple cable lists; and determining a network structure of the storage system based on the distance between the first node and the second node.

According to an example implementation of the present disclosure, determining the distance includes: determining the distance between the first node and the second node to be 1 in response to determining that there is an intersection between the first cable list and the second cable list.

According to an example implementation of the present disclosure, determining the distance includes: in response to determining that there is no intersection between the first cable list and the second cable list, selecting from the multiple nodes a third node with a known distance from the first node; and determining the distance between the first node and the second node based on a comparison between the first cable list and a third cable list associated with the third node in the multiple cable lists.

According to an example implementation of the present disclosure, determining the distance between the first node and the second node based on a comparison between the first cable list and the third cable list includes: determining the distance between the first node and the second node based on the distance between the first node and the third node in response to determining that there is an intersection between the first cable list and the third cable list.

According to an example implementation of the present disclosure, determining the distance between the first node and the second node includes: in response to determining that there is no intersection between the first cable list and the third cable list, selecting from the multiple nodes a fourth node with a known distance from the first node; and determining the distance between the first node and the second node based on a comparison between the first cable list and a fourth cable list associated with the fourth node in the multiple cable lists.

According to an example implementation of the present disclosure, acquiring the multiple cable lists includes: reading the cable lists from a baseboard management controller associated with the node.

According to an example implementation of the present disclosure, determining the distance includes: updating the distance based on the number of the multiple nodes in response to determining that the multiple nodes are connected in a loop.

According to an example implementation of the present disclosure, the storage system includes a storage control node and multiple storage device nodes, the storage control node including a first control node and a second control node, and the storage device nodes including a first storage node and a second storage node.

According to an example implementation of the present disclosure, the method further includes: in response to receiving, at the storage control node, an access to a storage device node in the multiple storage device nodes, determining, based on the network structure, a path for accessing the storage device node; and notifying the storage control node to access the storage device node based on the path.

According to an example implementation of the present disclosure, the node includes multiple ports, and the cable list includes an identifier of cable connected to each of the multiple ports, and determining the network structure includes: in response to determining that a cable list associated with each of the multiple nodes has been compared with another cable list, confirming that the network structure includes all connection relationships between the multiple nodes.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided. The computer-readable medium stores machine-executable instructions which, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, or partly on a user computer, or as a stand-alone software package, or partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. The computer-readable program instructions may also be stored in the computer-readable storage medium. The instructions enable a computer, a programmable data processing apparatus, and/or other devices to operate in a specific manner, so that the computer-readable medium storing the instructions includes an article of manufacture that includes instructions for implementing various aspects of functions/actions specified in one or more blocks in the flow charts and/or the block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process. Thus, the instructions executed on the computer, other programmable data processing apparatuses, or other devices implement the functions/actions specified in one or more blocks in the flow charts and/or the block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing a storage system, the method including:
   acquiring multiple cable lists associated with multiple nodes included in the storage system, respectively, a cable list including an identifier of cable of at least one cable for connecting a node of the multiple nodes with a node other than the node;
   determining a distance between a first node in the multiple nodes and a second node in the multiple nodes based on a comparison between a first cable list associated with the first node and a second cable list associated with the second node in the multiple cable lists; and
   determining a network structure of the storage system based on the distance between the first node and the second node;
   wherein determining the distance includes: in response to determining that there is no intersection between the first cable list and the second cable list,
      selecting from the multiple nodes a third node with a known distance from the first node; and
      determining the distance between the first node and the second node based on a comparison between the first cable list and a third cable list associated with the third node in the multiple cable lists; and
   wherein determining the distance between the first node and the second node based on a comparison between the first cable list and the third cable list includes:
      determining the distance between the first node and the second node based on the distance between the first node and the third node in response to determining that there is an intersection between the first cable list and the third cable list.

2. The method according to claim 1, wherein determining the distance between the first node and the second node based on the distance between the first node and the third node includes:
   determining the distance between the first node and the third node to be 1 in response to determining that there is an intersection between the first cable list and the third cable list.

3. The method according to claim 1, wherein determining the distance between the first node and the second node includes: in response to determining that there is no intersection between the second cable list and the third cable list,
   selecting from the multiple nodes a fourth node with a known distance from the first node; and
   determining the distance between the first node and the second node based on a comparison between the third cable list and a fourth cable list associated with the fourth node in the multiple cable lists.

4. The method according to claim 1, wherein acquiring the multiple cable lists includes: reading the cable lists from a baseboard management controller associated with the node.

5. The method according to claim 1, wherein determining the distance includes: updating the distance based on the number of the multiple nodes in response to determining that the multiple nodes are connected in a loop.

6. The method according to claim 1, wherein the storage system includes a storage control node and multiple storage device nodes, the storage control node including a first control node and a second control node, and the storage device nodes including a first storage node and a second storage node.

7. The method according to claim 6, further including:
   in response to receiving, at the storage control node, an access to a storage device node in the multiple storage device nodes, determining, based on the network structure, a path for accessing the storage device node; and
   notifying the storage control node to access the storage device node based on the path.

8. The method according to claim 1, wherein the node includes multiple ports, and wherein the cable list includes an identifier of cable connected to each of the multiple ports, and wherein determining the network structure includes: in response to determining that a cable list associated with each of the multiple nodes has been compared with another cable list, confirming that the network structure includes all connection relationships between the multiple nodes.

9. An electronic device, including:
   at least one processor;
   a volatile memory; and
   a memory coupled to the at least one processor, the memory having instructions stored therein, wherein the instructions, when executed by the at least one processor, cause the device to execute a method for managing a storage system, the method including:
      acquiring multiple cable lists associated with multiple nodes included in the storage system, respectively, a cable list including an identifier of cable of at least one cable for connecting a node of the multiple nodes with a node other than the node;
      determining a distance between a first node in the multiple nodes and a second node in the multiple nodes based on a comparison between a first cable list associated with the first node and a second cable list associated with the second node in the multiple cable lists; and
      determining a network structure of the storage system based on the distance between the first node and the second node;
   wherein determining the distance includes: in response to determining that there is no intersection between the first cable list and the second cable list,
      selecting from the multiple nodes a third node with a known distance from the first node; and
      determining the distance between the first node and the second node based on a comparison between the first cable list and a third cable list associated with the third node in the multiple cable lists; and
   wherein determining the distance between the first node and the second node based on a comparison between the first cable list and the third cable list includes:
      determining the distance between the first node and the second node based on the distance between the first node and the third node in response to determining that there is an intersection between the first cable list and the third cable list.

10. The device according to claim 9, wherein determining the distance between the first node and the second node based on the distance between the first node and the third node includes:

determining the distance between the first node and the third node to be 1 in response to determining that there is an intersection between the first cable list and the third cable list.

11. The device according to claim 9, wherein determining the distance between the first node and the second node based on the distance between the first node and the third node includes: in response to determining that there is no intersection between the second cable list and the third cable list,
  selecting from the multiple nodes a fourth node with a known distance from the first node; and
  determining the distance between the first node and the second node based on a comparison between the third cable list and a fourth cable list associated with the fourth node in the multiple cable lists.

12. The device according to claim 9, wherein acquiring the multiple cable lists includes: reading the cable lists from a baseboard management controller associated with the node; and
  wherein determining the distance includes: updating the distance based on the number of the multiple nodes in response to determining that the multiple nodes are connected in a loop.

13. The device according to claim 9, wherein the storage system includes a storage control node and multiple storage device nodes, the storage control node including a first control node and a second control node, and the storage device nodes including a first storage node and a second storage node.

14. The device according to claim 13, wherein the method further includes:
  in response to receiving, at the storage control node, an access to a storage device node in the multiple storage device nodes, determining, based on the network structure, a path for accessing the storage device node; and
  notifying the storage control node to access the storage device node based on the path.

15. The device according to claim 9, wherein the node includes multiple ports, wherein the cable list includes an identifier of cable connected to each of the multiple ports, and wherein determining the network structure includes: in response to determining that a cable list associated with each of the multiple nodes has been compared with another cable list, confirming that the network structure includes all connection relationships between the multiple nodes.

16. The device according to claim 9, wherein acquiring the multiple cable lists includes: reading the cable lists from a baseboard management controller associated with the node.

17. A computer program product having a non-transitory computer readable medium which stores a set of instructions to manage a storage system; the set of instructions, when carried out by computerized circuitry, causing the computerized circuitry to perform a method of:
  acquiring multiple cable lists associated with multiple nodes included in the storage system, respectively, a cable list including an identifier of cable of at least one cable for connecting a node of the multiple nodes with a node other than the node;
  determining a distance between a first node in the multiple nodes and a second node in the multiple nodes based on a comparison between a first cable list associated with the first node and a second cable list associated with the second node in the multiple cable lists; and
  determining a network structure of the storage system based on the distance between the first node and the second node;
wherein determining the distance includes: in response to determining that there is no intersection between the first cable list and the second cable list,
  selecting from the multiple nodes a third node with a known distance from the first node; and
  determining the distance between the first node and the second node based on a comparison between the first cable list and a third cable list associated with the third node in the multiple cable lists; and
wherein determining the distance between the first node and the second node based on a comparison between the first cable list and the third cable list includes:
  determining the distance between the first node and the second node based on the distance between the first node and the third node in response to determining that there is an intersection between the first cable list and the third cable list.

18. The computer program product according to claim 17, wherein determining the distance between the first node and the second node includes:
  determining the distance between the first node and the third node to be 1 in response to determining that there is an intersection between the first cable list and the third cable list.

19. The computer program product according to claim 17, wherein determining the distance between the first node and the second node includes: in response to determining that there is no intersection between the second cable list and the third cable list,
  selecting from the multiple nodes a fourth node with a known distance from the first node; and
  determining the distance between the first node and the second node based on a comparison between the third cable list and a fourth cable list associated with the fourth node in the multiple cable lists.

20. The computer program product according to claim 17, wherein the storage system includes a storage control node and multiple storage device nodes, the storage control node including a first control node and a second control node, and the storage device nodes including a first storage node and a second storage node.

* * * * *